Figure 1:
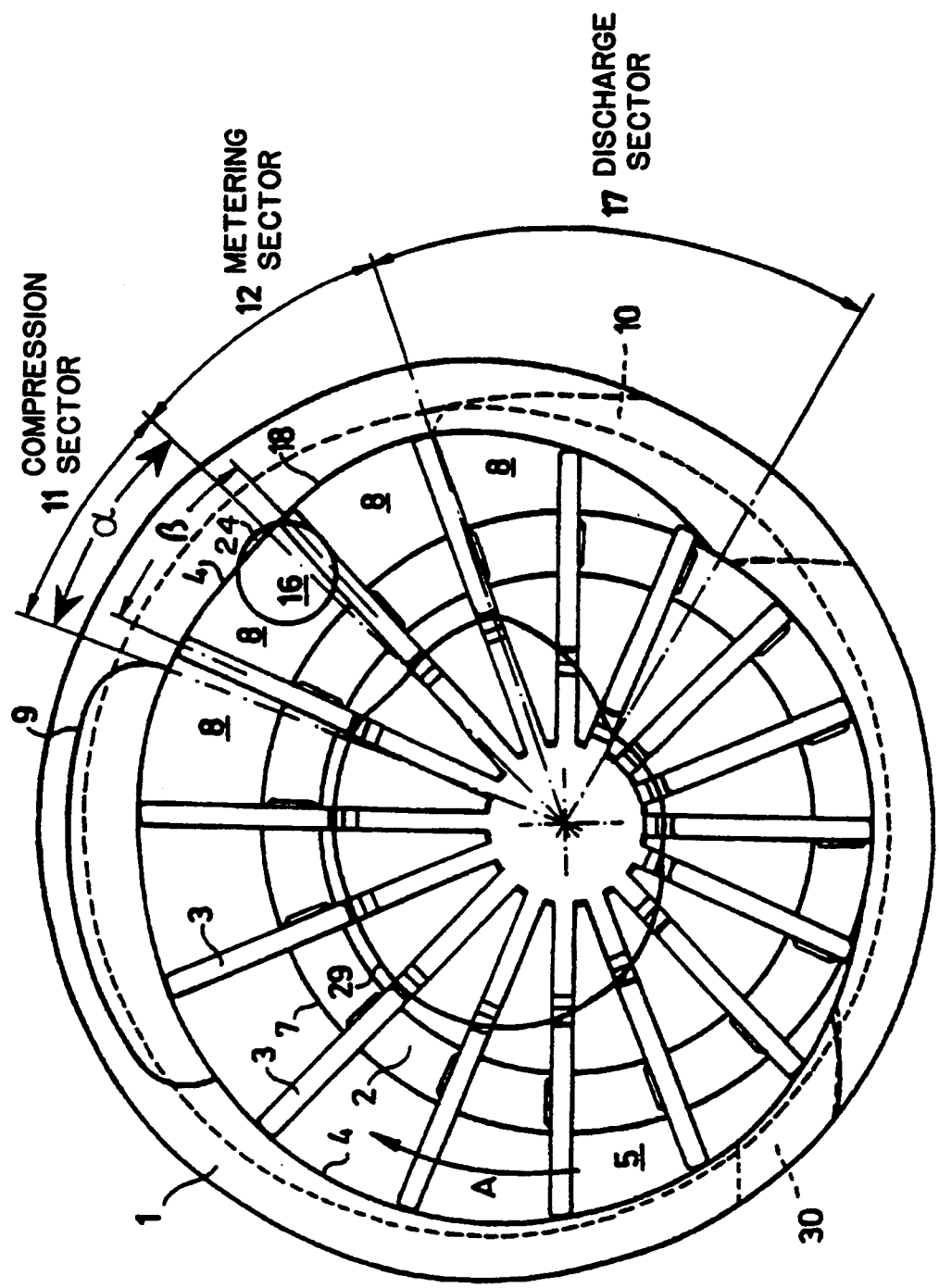

United States Patent [19]
Staudenrausch

[11] Patent Number: 5,380,240
[45] Date of Patent: Jan. 10, 1995

[54] PROCESS AND DEVICE FOR THE SUBDIVISION OF A PASTY AND COMPRESSIBLE MASS IN PORTIONS, IN PARTICULAR OF SAUSAGE MEAT BY MEANS OF A VANE CELL PUMP

[75] Inventor: Georg Staudenrausch, Biberach/Riss, Germany

[73] Assignee: Albert Handtmann Maschinenfabrik GmbH & Co. KG, Biberach/Riss, Germany

[21] Appl. No.: 107,995

[22] Filed: Aug. 18, 1993

[30] Foreign Application Priority Data

Aug. 20, 1992 [DE] Germany .............. 4227621

[51] Int. Cl.$^6$ .............................................. A22C 11/08
[52] U.S. Cl. ...................................... 452/41; 418/261
[58] Field of Search ............ 452/41, 40; 418/15, 418/41, 127, 255, 260, 261

[56] References Cited

U.S. PATENT DOCUMENTS

| | | | |
|---|---|---|---|
| 2,963,735 | 12/1960 | Gaudlitz | 452/41 |
| 3,320,899 | 5/1967 | von Thuengen et al. | |
| 3,631,565 | 1/1972 | Muller | 452/41 |
| 3,930,763 | 1/1976 | Rose | 452/41 |
| 4,557,678 | 12/1985 | Nishimura | 418/15 |
| 4,694,536 | 9/1987 | Townsend | 452/41 |
| 5,052,974 | 10/1991 | Räther | 452/41 |
| 5,069,608 | 12/1991 | Räther | 452/41 |
| 5,102,314 | 4/1992 | Staudenrausch | 418/180 |

FOREIGN PATENT DOCUMENTS 780859 8/1957 United Kingdom .

*Primary Examiner*—Willis Little
*Attorney, Agent, or Firm*—Finnegan, Henderson, Farabow, Garrett & Dunner

[57] ABSTRACT

A process and apparatus for the subdivision of a pasty and compressible mass, in particular sausage meat, in portions by means of a vane cell pump. To achieve a high portioning accuracy in simple fashion, each conveying cell filled with sausage meat passes through a metering sector disposed between a compression sector and a discharge sector after having passed through the compression sector, an excessive amount of sausage meat being pressed back into the subsequent conveying cell still in communication with the inlet from the conveying cell with highly compressed sausage meat by means of a balancing cylinder piston unit located in the boundary area between the compression sector and the metering sector.

5 Claims, 3 Drawing Sheets

PROCESS AND DEVICE FOR THE SUBDIVISION OF A PASTY AND COMPRESSIBLE MASS IN PORTIONS, IN PARTICULAR OF SAUSAGE MEAT BY MEANS OF A VANE CELL PUMP

The invention relates to a process for the subdivision of a pasty and compressible mass in portions, in particular of sausage meat by means of a vane cell pump, in which the sausage meat enters through an inlet and is subsequently compressed by means of the rotating conveyor cells formed by the vanes and is then discharged through an outlet.

Moreover, the invention relates to a vane cell pump for implementing the process.

It is known to use a process for the portioning of sausage meat with the greatest possible accuracy, which contains a more or less large share of air, according to which the air-containing sausage meat is supplied to a metering system at a pressure, which compresses the air content in the sausage meat to a fraction of the normal pressure volume by means of a supply pump of its own.

By means of this, sausage meat with minimal voids is processed in the metering system so that a high weight accuracy is achieved. At first, the process was implemented by supplying the sausage meat to a metering pump through a supply pump at an adjustable pressure. When the adjusted pressure was exceeded, the pressure of the supply pump was reduced. A damping tube prevented pressure peaks or supplied additional required sausage meat, if the metering pump required more than the supply could supply e.g. during the start.

The process was also implemented with another arrangement by supplying sausage meat to a metering pump by a continuous supply pump, the supply pressure having been adjusted by means of a pressure control valve. Too much sausage meat was of course delivered by a continuous supply pump, which was again supplied into a funnel of the supply pump by means of the supply pump.

Two pumps and feed pipes were required in both cases, i.e. dead volumes. The use of a pressure control valve entailed the risk of a quality impairment of the sausage meat.

The invention is based on the object of developing a process and a device in such fashion that a high portioning accuracy is achieved in a simple way.

The invention provides in a process to attain this object that each conveying cell filled with sausage meat passes between a metering sector disposed between a compression sector and a discharge sector after having passed through the compression sector, an excessive amount of sausage meat being pressed back into the subsequent conveying cell still in communication with the inlet from the conveying cell with highly compressed sausage meat by means of a balancing cylinder piston unit in the boundary area between the compression sector and the metering sector.

Thus, only a single vane cell pump is still required for the implementation of this process.

According to the invention, this process can be further developed in simple fashion so that the balancing piston is controlled by a biased spring by pressing it at first back in the balancing cylinder during the compression of the sausage meat, that the balancing piston gets into communication with the subsequent conveying cell with a still slightly increasing compression pressure, and the pressure spring pushes the sausage meat located in the balancing cylinder into the subsequent conveying cell by means of the balancing piston.

The bias of the pressure spring can be varied according to the invention to adapt it to the respective compressibility of the sausage meat to be processed.

However, it is also conceivable that the bias for the balancing piston is electronically controlled by means of a pressure sensor.

The vane cell pump is designed in such fashion according to the invention that a metering sector is disposed between the compression sector adjoining the inlet and the discharge sector, that the angle of the compression sector is approximately of equal size as the sector angle of a conveying cell, that an axially directed balancing cylinder, which is open towards the interior of the pump case, is disposed in the area of the inner wall of the pump housing and—seen in the direction of rotation of the rotor—in the end area of the compression sector in the bottom or the cover of the pump case, in which a balancing piston is slidingly mounted, which is pressed into a front position by a spring, in which the piston bottom is flush with the bottom or the cover of the pump housing, the balancing cylinder extending both into the compression sector and into the metering sector.

Figure 9:
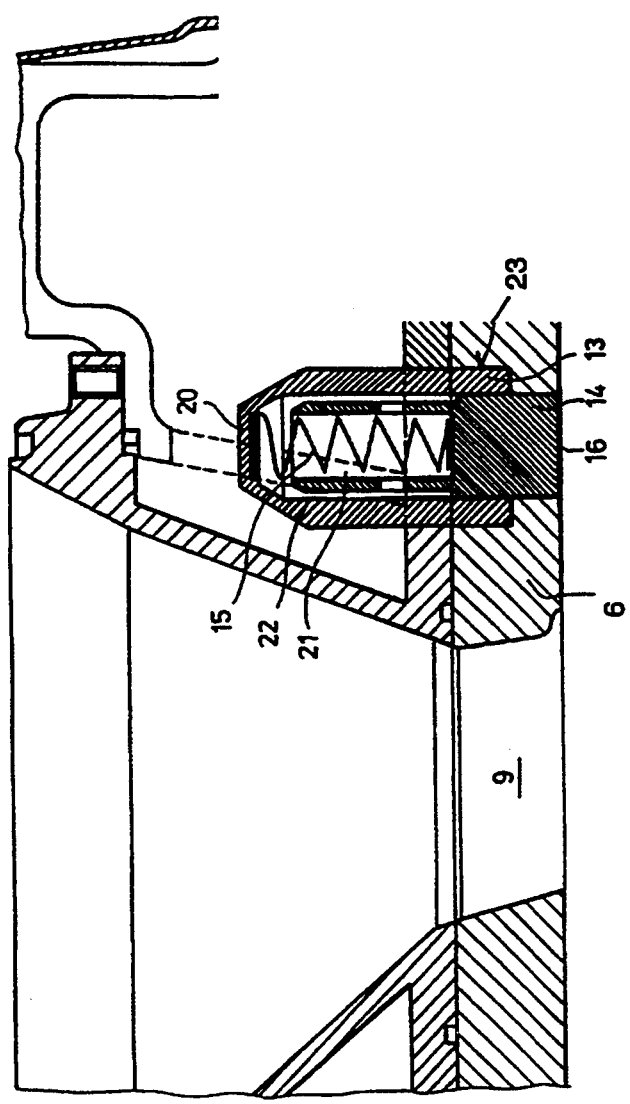

Further features and advantages of the invention result from the following description in connection with the drawing, in which FIG. 1 is a schematic top view of the vane cell pump, the cover being omitted, FIGS. 2 to 8 show in each case the sector area between inlet and outlet as a top view of the pump housing in successive positions of a conveying cell, and FIG. 9 is an axial partial section through the pump case and the balancing cylinder/piston unit.

As shown in FIG. 1, the vane cell pump consists of a pump housing 1 and a rotor 2, which is eccentrically rotated therein and vanes 3 which are mounted therein radially displaceable, and form conveying cells 8 with the wall 4 of the pump housing 1. The bottom 5 and the cover 6 of the housing 1 and the outer surface 7 of the rotor 2 cooperate in sealing fashion, the pump housing 1 having a sausage meat inlet 9 and a sausage meat outlet 10, between which a compression sector 11 is located.

A metering sector 12 is disposed downstream of the compression sector 11 directly adjoining the sausage meat inlet 9.

The compression sector 11 has an angle $\alpha$, which is approximately of the same size as the angle $\beta$ of the sector of a conveying cell 8, which is formed by the central lines of two adjacent vanes 3.

An axially directed balancing cylinder 13 is disposed in the area of the interior wall of the pump housing 1 and—looking in the direction of rotation of the rotor 2—in the end area of the compression sector 11 in the cover 6 of the pump housing 1 (FIG. 9). The balancing cylinder 13 is open towards the interior of the pump housing 11. A balancing piston 14 is slidingly mounted in the balancing cylinder 13. The balancing piston 14 has an axially directed bore 21 in its rear end, in which a pressure spring 15 is mounted which is supported against the bottom 20 of the balancing cylinder 13 and is under bias so that it presses the balancing piston 14 forwards, i.e. in the direction towards the interior of the pump housing 1.

In the forward position of the balancing piston 14 as it is shown in FIG. 9, it is supported on the upper edge of the pump housing 1 at the point 24 (FIG. 1).

The bottom 16 of the balancing piston 14 is flush with the inner side of the cover 6 of the pump housing 1 in the forward position so that the piston bottom forms a smooth surface with the inner side of the cover 6 and the vanes 3 are not prevented from sliding freely thereover.

The balancing cylinder 13 is pressed into a blind hole bore 23 in the cover 6 and fixed therein.

After pivoting the cover 6 of the pump case away (or after opening it), the balancing piston 14 can be removed from the balancing cylinder 13.

The spring 15 can e.g. be replaced by a stronger or weaker pressure spring.

The diameter of the balancing cylinder 13 or of the balancing piston 14 is selected so that it extends both into the compression sector 11 and into the metering sector 12 in respect to the position described above.

The bottom 16 of the balancing piston 14 is schematically represented as a circle in FIGS. 1 to 8.

As is in particular revealed by FIG. 1, the inner wall 4 of the pump housing has a contour profile 18 deviating from a circular arc, which defines the compression sector 11 and the discharge sector 17. The contour extends like a circular arc with the center in the rotor center in the area of the metering sector 12.

The rotor 2 rotates together with the vanes 3 in the direction of arrow A.

The compression sector 11 with the angle $\alpha$, the adjoining metering sector 12 and the discharge sector 17 are represented in their positions relative to each other in FIG. 1.

The conveying cells 8 pass successively through the compression sector 11, the metering sector 12 and the discharge sector 17, in each case in the direction of arrow A.

As each filled conveying cell 8 passes through the compression sector, a compression of the sausage meat located in the respective conveying cell takes place due to the contour profile 18 in such fashion that the sausage meat is compressed depending on the compressibility in accordance with the volume reduction.

Subsequently, the conveying cell with compressed sausage meat passes into the metering sector 12. There the contour profile 18 extends a circular arc, but the sausage meat is nevertheless still compressed somewhat more as long as the trailing vane 3a of the conveying cell 8a is still in the compression sector.

The specific gravity of the compressed volume in this conveying cell corresponds largely to the volume in the discharge sector which is under a higher pressure; due to this a pulsating is practically prevented.

The operation of the balancing cylinder 13 or of the balancing piston 14 is explained in the following by means of FIGS. 2 to 8.

Figure 2:
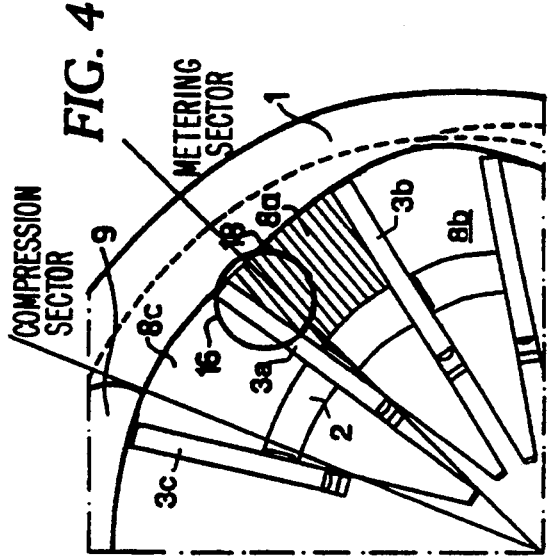

A conveying cell 8a filled with sausage meat is represented in FIG. 2 in a position where the trailing vane 3a just has passed over the rear edge of the sausage meat inlet 9 so that the conveying cell 8a is completely closed. The conveying cell 8a now continues to move clockwise, the volume of the conveying cell 8a being reduced by the contour profile 18 of the inner wall 4, and the sausage meat is increasingly compressed in the conveying cell in this fashion.

The bottom 16 of the balancing piston 14 extends, in this position of the conveying cell 8a, beyond the cell 8a into the leading conveying cell 8b. The pressure of the spring 15 of the balancing piston is, however, great enough so that at first the spring will not be compressed by the sausage meat so that the sausage meat cannot yield in this position of the cell.

Figure 3:
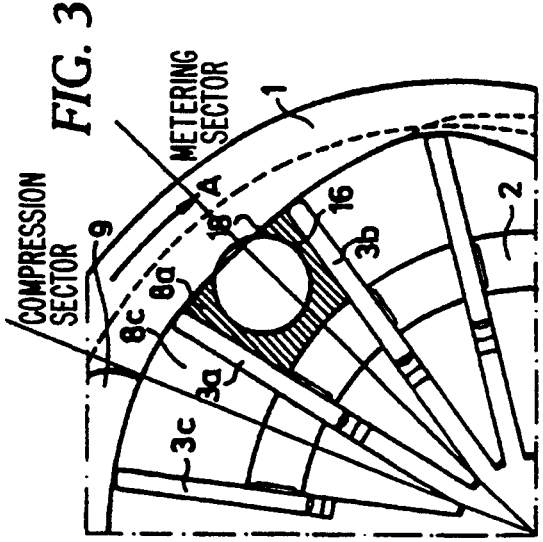

As shown in FIG. 3, now the conveying cell 8a has reached a position due to the rotation of the rotor 2 where it is still predominantly in the compression sector 11, but already extends partly into the metering sector 12. A further increase of the compression pressure takes place during the movement of the conveying cell 8a from the position shown in FIG. 2 to the position shown in FIG. 3, which pressure becomes high enough depending upon the compressibility of the sausage meat, that the balancing piston 14 yields, i.e. the pressure of the spring is overcome. As the piston 14 yields, the chamber in the balancing cylinder 13 is filled with sausage meat.

Figure 4:
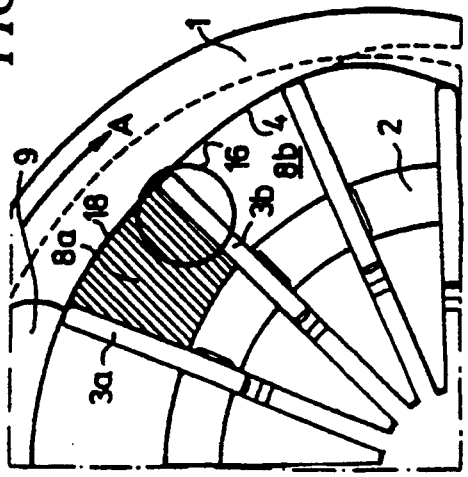

In the position of the conveying cell 8a filled with sausage meat and being compressed, which is shown in FIG. 4, the cell has now largely passed through the compression sector and the compression pressure has approached a maximum.

The subsequent conveying cell 8c is now already filled with sausage meat, but is still in communication with the sausage meat inlet 9, because the trailing vane 3c has not yet reached the edge of the sausage meat inlet 9.

For the sake of completeness it is still mentioned that the filling of the sausage meat into the conveying cells preferably takes place with vacuum, which promotes a rapid filling of the conveying cells.

In the position of the conveying cell 8a as shown in FIG. 4, the piston bottom 16 now extends both beyond the conveying cell 8a with the high compression pressure of the sausage meat and into the subsequent conveying cell 8c, which is not filled as yet with compressed sausage meat.

The chamber in the balancing cylinder 13 which is filled with the sausage meat is now connected both with the conveying cell 8a, where the sausage meat has already been compressed almost up to the maximum and with the conveying cell 8c where the sausage meat has still not been subjected to any compression.

Due to this, the pressure spring 15 presses the balancing piston 14 forwards, which is partly relieved from the compression pressure and, at the same time, pushes the sausage meat located in the chamber of the balancing cylinder 13 from the conveying cell 8a into the subsequent conveying cell 8c.

Figure 5:
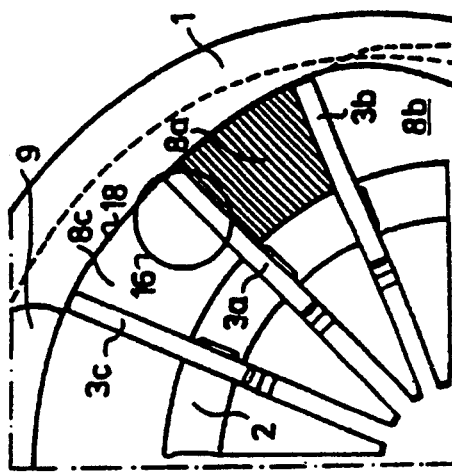
Figure 6:
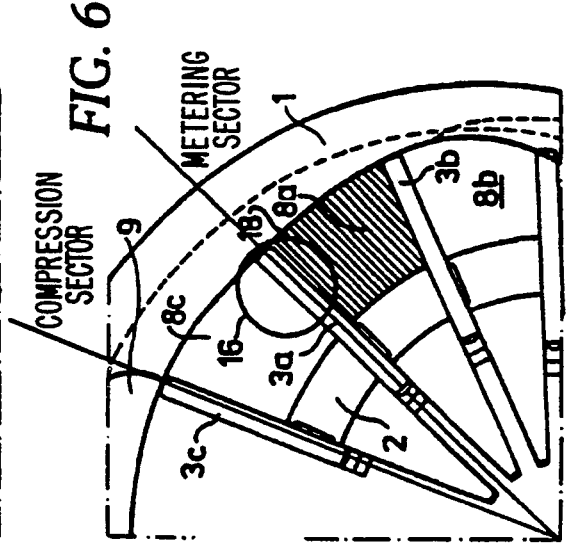

This procedure is continued beyond the position according to FIG. 5 until the conveying cell 8c has reached the position according to FIG. 6, i.e. is completely closed. Until that time a slight increase in compression takes always place as long as the trailing vane 3a still moves in the compression sector 11.

The sausage meat is maximally compressed in the conveying cell 8a in the position according to FIG. 6, after which there is no further compression.

Figure 7:
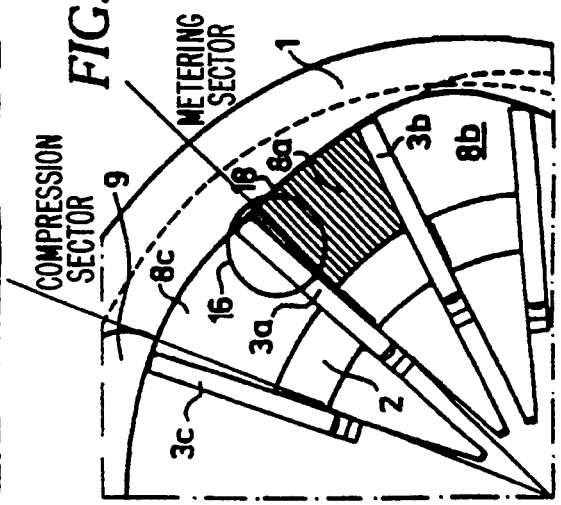

The sausage meat in the conveying cell 8a has the same compression pressure in the position according to FIG. 7 as in the position according to FIG. 6.

In this fashion, a displacement of the excessive sausage meat in the conveying cell 8a and then, in the same fashion, in the respective subsequent conveying cells is achieved due to the adjustment of the maximum compression pressure so that each conveying cell finally discharges the same amount of sausage meat with the same consistency. The contents of the conveying cells have practically the same weight in the discharge sector.

When the conveying cells 8a and 8c have reached the position according to FIG. 7, the piston bottom 16 now extends into the conveying cell 8a with a very small section, the trailing conveying cell 8c, however, is already completely closed and is already located in the compression sector so that a pushing of sausage meat from the conveying cell 8a into the conveying cell 8c does substantially not take place any longer.

Figure 8:
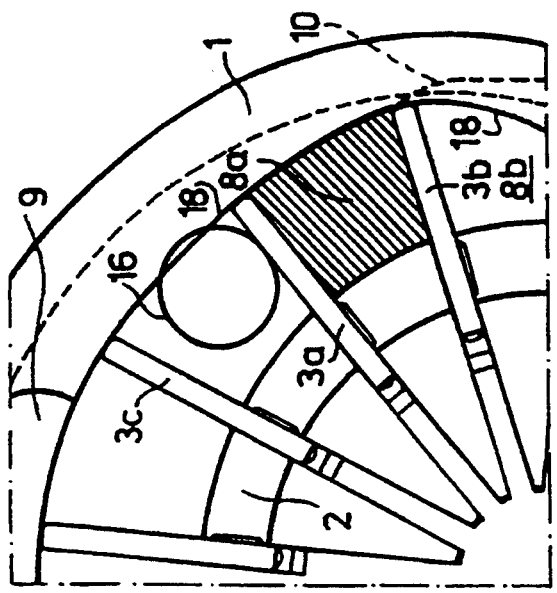

In the position of the conveying cell 8a shown in FIG. 8 the leading vane 3b of the conveying cell 8a just passes over the front edge of the sausage meat outlet 10 (drawn in dashed lines).

It is of essential importance for achieving the high portioning accuracy aimed at that a tightness between sausage meat outlet and sausage meat inlet is given in each position of the conveying cells with the described device. In other words, the chamber opening towards the outlet is under a defined high pressure and is not in communication with the inlet.

By changing the force of the spring 15 for the balancing piston 14, the compression pressure can be adapted to the discharge pressure. Thus a pulsating is avoided both from the chamber and into the chamber so that in this fashion the highest weight accuracy is achieved in connection with the described measures.

The adjustable maximum compression pressure into the conveying cells is used for pushing in each case excessive sausage meat in the compressed conveying cell into the trailing cell.

The invention thus achieves a very high metering accuracy with relatively simple means. This is achieved by the fact that the filling and metering process is moved to one and the same conveying mechanism (vane cell pump). The filling at constant pressure is carried out in the compression sector, the balancing cylinder located at the end of this area being only acted upon with a small excess filling amount at a limited filling pressure, and that this excessive filling amount is immediately delivered to the subsequent conveying cell still open towards the inlet.

The metering takes place in the metering sector.

Since the supplying and metering takes place in the same conveying mechanism, i.e. in mechanically coupled fashion, a need to return larger amounts of sausage meat via a pressure control valve and/or the shutting down of a supply pump when the filling pressure is reached is avoided.

Neither an increase nor a decrease of the supply with unevenly running metering flow nor a storage cylinder for maintaining the supply pressure, e.g. during start, is required.

I claim:

1. In a process for the subdivision of a pasty and compressible mass into portions in a rotating vane cell pump having a plurality of revolving conveying cells, in which the mass is fed through an inlet in the pump into the cells, subsequently compressed therein in a compression sector and then discharged therefrom in a discharge sector through an outlet in the pump as the cells revolve in the pump, the improvement comprising revolving each conveying cell filled with pasty mass through a metering sector located between the compression sector and the discharge sector after the cell has passed through the compression sector, a cell not being located entirely in the metering sector until the next succeeding cell has passed beyond the inlet and is located entirely in the compression sector, and pressing back into the next succeeding conveying cell while it is still in communication with the inlet of the pump, any excess amount of compressed mass in a conveying cell after a portion of said cell has passed through the compression sector and said cell is now located in a boundary area between the compression sector and the metering sector.

2. The process of claim 1, wherein the excess amount of compressed mass is forced into a chamber in communication with the revolving cell when said cell is located in said boundary area by the compression pressure previously generated in the compression sector against the bias of a compressible spring, which mass in the chamber is then pressed back into said next succeeding conveying cell by said spring when said succeeding conveying cell revolves into communication with said chamber and while said succeeding conveying cell is still in communication with the inlet of the pump.

3. The process of claim 2, wherein the force of the compression spring is adjusted depending upon the compressibility of the mass.

4. A vane cell pump for the subdivision of a pasty and compressible mass into portions comprising a pump housing having an inner wall and a top and bottom wall, a rotor mounted eccentrically within said pump housing about an axis of rotation, a plurality of vanes radially displaceable with respect to said rotor, said vanes defining with an immediately adjacent vane and the inner wall of the pump housing as well as the top and bottom walls thereof and an outer surface of the rotor, a plurality of angular conveying cells, the outer ends of the vanes cooperating with said inner wall in a sealing manner, said pump housing having an inlet and an outlet angularly offset therefrom in the direction of rotation of the rotor and the revolving of the cells, said pump housing having a compression sector following said inlet in the direction of rotation of the rotor for compressing the mass in said cells, the angle of said compression sector being approximately equal to the angle of an angular conveying cell so that until a cell is entirely within said compression sector it will still be in communication with said inlet, a metering sector between the compression sector and said outlet where the mass is maintained under compression pressure but not further compressed, the angle of said metering sector being sufficient so that when a cell is entirely within the compression sector, the immediately preceding cell has not yet reached said outlet, and an axially extending balancing cylinder having a chamber open towards the interior of the pump housing and located in a boundary area between the compression sector and the metering sector and a piston slidably mounted in said chamber and biased towards said interior under the force of a spring so that a bottom surface of said piston lies flush with the top or bottom wall of the housing, whereby when a conveying cell is located in said boundary area, excess compressed mass will be forced out of said cell and into said chamber of said cylinder by the compression pressure previously generated in the compression sector and against the bias of said spring and then as said cell passes beyond said boundary area and into said metering sector and the next succeeding cell has now revolved into communication with said chamber, but while it is still in communication with said inlet, the piston, under the bias of said spring, will force said excess compressed mass back into said next succeeding cell.

5. The vane cell pump of claim 4, wherein the spring of the balancing cylinder is adjustable.

* * * * *